Figure 1:
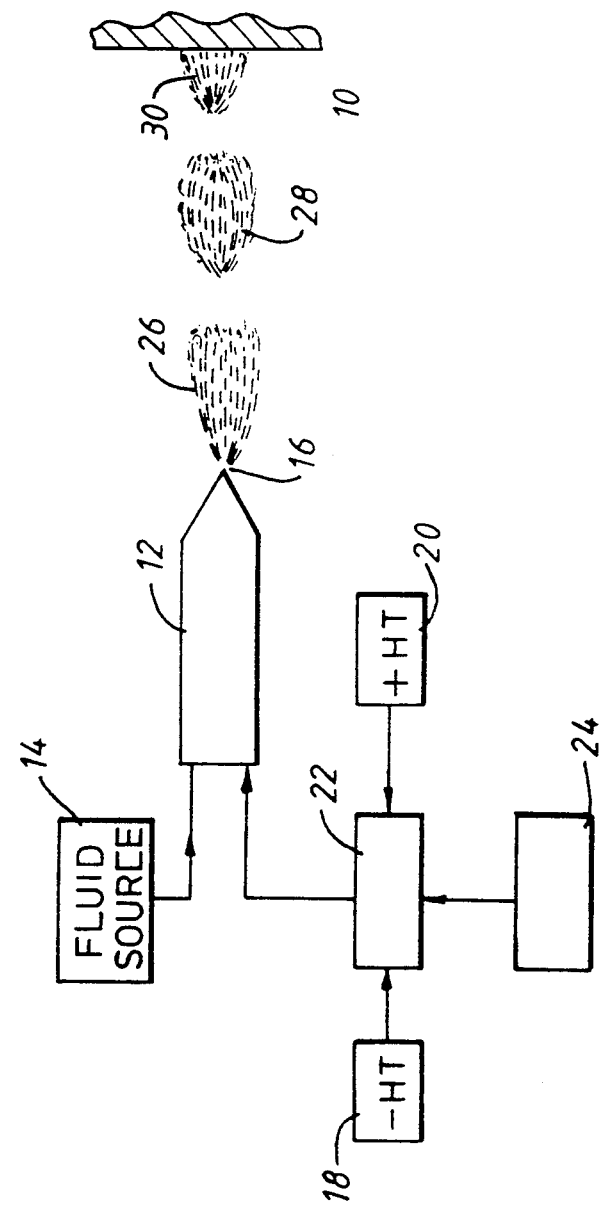

US005222663A

United States Patent [19]

Noakes et al.

[11] Patent Number: 5,222,663
[45] Date of Patent: Jun. 29, 1993

[54] ELECTROSTATIC SPRAYING DEVICE AND METHOD USING AN ALTERNATING POLARITY HIGH POTENTIAL

[75] Inventors: Timothy J. Noakes, Clwyd, Wales; Brian A. Reed, Swindon; John J. Chambers, Gloucestershire, both of England

[73] Assignee: Imperial Chemical Industries PLC, London, England

[21] Appl. No.: 735,016

[22] Filed: Jul. 25, 1991

[30] Foreign Application Priority Data

Jul. 25, 1990 [GB] United Kingdom ................ 9016346
Jul. 3, 1991 [GB] United Kingdom ................ 9114343

[51] Int. Cl.[5] ........................ B05B 5/053; B05B 5/16

[52] U.S. Cl. ...................................... 239/3; 239/690; 239/691

[58] Field of Search .................. 239/690, 691, 708, 3; 118/627, 629

[56] References Cited

U.S. PATENT DOCUMENTS 1,958,406 5/1934 Darrah .
4,336,275 6/1982 Scholes .......................... 118/627 X
4,343,828 8/1982 Smead et al. .................. 118/627 X
4,462,061 7/1984 Mommsen .
4,549,243 10/1985 Owen et al. .................. 239/690 X
4,703,891 11/1987 Jackson et al. ................ 239/691 X
4,737,887 4/1988 Thome .......................... 239/691 X
5,032,422 7/1991 Lamirand et al. ............. 118/627 X

FOREIGN PATENT DOCUMENTS 0274949 7/1988 European Pat. Off. ........... 239/691
2198900 5/1984 United Kingdom .

*Primary Examiner*—Andres Kashnikow
*Assistant Examiner*—William Grant
*Attorney, Agent, or Firm*—Cushman, Darby & Cushman

[57] ABSTRACT

An electrostatic spraying device in which liquid emerging from an outlet of the device nozzle (12) is subjected to an electrical field sufficiently high for the liquid to be drawn from the outlet as one or more ligaments which break up into charged droplets to form the spray. The device is adapted for the spraying of targets which are conventionally difficult to coat electrostatically, eg. targets of insulating material. This is achieved by the use of circuitry (18, 20, 22, 24) which generates a bipolar high voltage output having a frequency such that successive clouds of particles are charged with opposite polarity but do not discharge each other in flight. In this way, the charge applied to the particles is effective to assist seeking of the target without leading to build-up of charge on the target.

22 Claims, 2 Drawing Sheets

ELECTROSTATIC SPRAYING DEVICE AND METHOD USING AN ALTERNATING POLARITY HIGH POTENTIAL

BACKGROUND OF THE INVENTION

The present invention relates to electrostatic liquid spraying devices.

On the whole, such devices use a direct current high tension source in order to electrostatically charge the particles of the liquid spray. However, it is known from U.S. Pat. No. 1958406 to use a source of alternating potential in conjunction with an electrostatic spraying device but there is no explicit teaching as to the frequency employed. The general tenor of the disclosure implies that the frequency utilized is mains frequency, ie. 60 Hz in the USA.

It is also known from UK Patent No 2128900 to provide a lever-operated spraying device in which an atomizes spray is produced from a nozzle by squeezing the lever. This device includes a needle electrode to ionize the spray emerging at the outlet of the nozzle. In one embodiment, the voltage generator is piezo-electric and the action of alternately squeezing and releasing the lever results in high voltage pulses of successive opposite polarity being applied to the electrode. During the squeezing action, spray is produced and the resulting droplets are charged by corona discharge from the electrode. During the release action, no spray will be produced but the high voltage at the needle may reverse in polarity to produce a corona discharge which may serve to eliminate or modify static when the device is used in certain applications.

SUMMARY OF THE INVENTION

The present invention resides in the recognition that certain advantages can be derived from the use of alternating potential sources by appropriate selection of the frequency of the source.

According to one aspect of the present invention there is provided electrostatic spraying apparatus comprising a nozzle, means for supplying liquid to the nozzle, and high voltage circuitry arranged so that, in use, liquid sprayed in atomized form from, the nozzle is electrostatically charged. The high voltage circuitry provides an output which alternates between opposite polarities, the frequency of the alternating output being such that each cloud of atomized particles charged with one polarity issues from the nozzle substantially without discharging the particles of a preceding cloud of atomized particles carrying the opposite charge, at least not while the successive clouds are air-borne.

Thus, in accordance with this aspect of the invention, the frequency is selected so that at least a major proportion of the particles of successive spray clouds retain their charge and are not discharged to any significant extent by other spray clouds of particles issuing from the nozzle while the liquid is subjected to charging with the opposite polarity.

From the disclosure of U.S. Pat. No. 1958406, it is clear that, where an alternating source of potential is used, successive clouds of particles substantially discharge one another. This will be the case where the frequency of the ac source is of the order of 60 Hz. Inevitably, discharge will not be complete and it will be possible to observe a proportion of droplets which are still charged but this will only represent a small fraction of the particles originally issuing from the nozzle. Thus, for example, in U.S. Pat. No. 1958406, reference is made to the production of particles of liquid so small that they appear to remain suspended indefinitely in air at ordinary room conditions. If a substantial proportion of such particles were in fact charged, they would tend to seek the nearest grounded object rather than remain suspended in air.

According to a second aspect of the invention there is provided a method of coating a target which is either so arranged, or is of a nature, that it accumulates charge, said method comprising supplying liquid to a nozzle, applying an alternating high potential so that liquid sprayed in atomized form from the nozzle is electrostatically charged. The frequency of the alternating high potential is such that each cloud of atomized particles charged with one polarity issues from the nozzle and deposits on the target substantially without discharging the particles of a preceding cloud of atomized particles carrying the opposite charge while the successive clouds are air-borne, whereby the deposited spray clouds substantially neutralize each other at the target.

Thus, according to this aspect of the present invention, a major proportion of the particles in each cloud retain their charge and are used to coat a target which tends to accumulate charge. The target may comprise an electrically insulating or semi-conducting material or it may comprise an electrically conducting material and be isolated from earth. In practice, such charge accumulating targets are notoriously difficult to coat by means of electrostatically generated sprays of liquid particles. For example, if an attempt is made to coat an insulating target with atomized particles charged by means of a dc high potential source, the particles all carry the same charge and the target rapidly becomes charged with the same polarity after an initial quantity of the liquid particles have deposited on the target. Consequently, successive clouds of particles are repelled and do not deposit on the target. This problem is overcome in accordance with said second aspect of the invention because each successive cloud of charged particles neutralizes the preceding cloud of deposited particles thereby eliminating any build-up of significant charge which would otherwise repel deposition of subsequent clouds of particles.

Typically, the frequency of the alternating high potential source is no greater than 10 Hz. Preferably, the frequency is no greater than 5 Hz.

Preferably the frequency is at least 0.5 Hz, more preferably at least 1 Hz.

The high voltage circuitry may comprise two high tension generators producing outputs of opposite polarity and switching means arranged to render the generators effective alternately to effect charging of the liquid, the frequency of switching being no greater than the frequencies specified above.

Alternatively, the high voltage circuitry may comprise a single high tension generator producing a bipolar output.

According to a feature of the present invention there is provided high voltage circuitry which comprises a voltage multiplying circuit having:

input terminal means for connection to a pulsed voltage source;

output terminal means for providing an output voltage which is bipolar and is a multiple of the voltage applied to the input terminal means:

two parallel sets of serially connected capacitors connected between the input and output terminal means;

a plurality of paired bi-directional switches interconnecting the sets of capacitors in such a way that each junction between successive capacitors in one of said sets is connected to a pair of said switches which couple the junction to opposite sides of a capacitor of the other set; and means for effecting alternating operation of the switches of each pair in phased relation with the pulsed voltage source and for cyclically varying such phased relation to cause the output voltage at the output terminal means to alternate between opposite polarities.

Preferably the device is adapted to accommodate one or more low power batteries which may be of the rechargeable type, means being provided for producing from the battery supply voltage a pulsed voltage for application to the input terminal means of the voltage multiplying circuit. Means may also be provided for effecting a preliminary multiplication step so that the magnitude of the pulsed voltage applied to the voltage multiplying circuit is a multiple of the battery supply voltage.

Conveniently, the bi-directional switches are self-commutating, ie. when triggered into a "on" state they do not require the triggering signal to be maintained in order to remain on but will remain on until current flow through the switch ceases.

In a preferred embodiment of the invention, the switches are constituted by triacs which are self-commutating devices.

Advantageously, the triacs are of the known type which can be triggered by optical signals.

In practice, it is preferred to operate the apparatus according to the above described aspects of the invention at a frequency somewhat lower than 10 Hz because frequencies at the higher end of the specified range tend to give rise to contamination problems. It would appear that at the instant of switchover, a situation exists in which the nozzle is at, for example, a negative polarity and is "looking" at a receding spray cloud of positive polarity. In such circumstances, it would appear that there is a tendency for the receding positive spray to be "pulled back" towards the nozzle, thereby risking contamination. Also as the frequency is increased, the risk increases of collision between a newly issuing spray cloud of one polarity and a receding spray cloud of the opposite polarity, and hence the formation of larger, discharged particles. For these reasons, it is contemplated that optimum operation of the apparatus will be at a frequency no greater than 5 Hz.

The liquid feed to the nozzle may be passive, eg. capillary fed, gravity fed or induced by the electric field generated by the high voltage circuitry. Alternatively, the liquid feed may be forced by means of a pumping arrangement or by the application of pressure, for example pressurization of a deformable reservoir for containing the liquid.

The waveform of the alternating output produced by the high voltage circuitry may be of various forms such as generally sinusoidal or generally square waveform.

The changeover in polarity may be relatively slow or there may be a pause at or in the region of the zero crossover point so that successive oppositely charged spray clouds are adequately spaced from one another to reduce or eliminate intermingling between successive spray clouds as they travel towards the target. A passive liquid feed is particularly suitable for this purpose. Where the liquid feed is forced, it is preferred that the changeover between polarities is rapid, otherwise there may be a tendency for the liquid accumulating at the nozzle between polarity switching (when the electric field is insufficient to cause ligament formation) to be projected in the form of a spurt when the electric field resumes sufficient intensity to produce ligament formation. Such spurting is undesirable in some instances.

In practice, the interruption interval between the positive and negative parts of the spraying cycle will be no less than 10 milliseconds and no greater than 100 milliseconds.

BRIEF DESCRIPTION OF THE DRAWINGS

The invention will now be described by way of example only with reference to the accompanying drawings in which:

FIG. 1 is a schematic arrangement of one form of apparatus in accordance with the invention;

FIG. 2 shows one embodiment of a schematic voltage multiplying circuit for use in generating a bi-polar high voltage output; and FIG. 3 shows another embodiment of a schematic voltage multiplying circuit for use in generating a bipolar high voltage output.

DETAILED DESCRIPTION OF A PREFERRED EMBODIMENT

Referring to FIG. 1, a target to be coated by electrostatic spraying in depicted by reference numeral 10. The target 10 is one which is of a nature that is difficult to coat by conventional techniques. For example, the target may be composed of an electrically insulating material such as a plastics material on which electrical charge tends to accumulate if an attempt is made to coat it with electrically charged particles. Such accumulated charge then tends to repel subsequent spray clouds of charged particles.

A nozzle 12 is arranged adjacent the target and is supplied with liquid from a source 14. The liquid feed may be passive (eg. by capillary action) or forced. The nozzle can be constructed and arranged to operate in the manner described for example in our prior British Patent No. 1569707 or European Patent No. 243031 such that the liquid supplied to the nozzle is drawn out preponderantly by electrostatic forces, substantially without corona discharge, into one or more ligaments which break up into electrically charged droplets. This necessitates a high electric field strength and in order to reduce the voltage required to produce sufficient field strength, the nozzle is formed with a sharp edge 16 from which the liquid sprays initially in the form of ligaments before breaking into droplets. The nozzle 12 may be of various configurations as described in the above mentioned prior Patents and it may be of insulating or semi-conducting material.

High voltage is supplied to the liquid by means of circuitry which, in the apparatus of FIG. 1, includes a pair of high tension generators 18, 20 producing outputs typically of the order of 20 kV. The generators 18, 20 produce outputs of opposite polarity which are alternately coupled to the nozzle 12 via switching circuitry 22 controlled by a controller 24 which may be adjustable or programmable to vary the switching conditions according to requirements, for example in dependence on the nature of the liquid to be sprayed. The switching circuitry 22 may, for instance, be controlled to give an output having a desired waveform, eg. generally square waveform or sinusoidal, and/or a desired gradient in the region of changeover from one polarity to the other and/or a pause period at or in the region of the zero cross-over point.

By producing an alternating potential for electrostatically charging the liquid, spray clouds can be caused to issue from the nozzle which have opposite polarities. In FIG. 1, such spray clouds are depicted by reference numerals 26, 28 and 30. Spray clouds 26 and 30, for example, may comprise positively charged liquid droplets while the droplets forming the spray cloud 28 will be negatively charged. By appropriate selection of the frequency with which the output from switching circuitry 22 alternates, it is possible to ensure that the spray clouds do not discharge one another in flight, but only neutralize each other upon deposition at the target. In this way, the charge applied to the droplets is effective to assist seeking of the target without leading to build-up of charge on the target.

In experimental work carried out using the apparatus of FIG. 1, successful spraying of Perspex and Melinex film materials (Perspex and Melinex are Registered Trade Marks) and also of polyurethane foam material was achieved, especially when the frequency of the alternating output was within the range of 1 to 5 Hz. At lower frequencies, particularly below 0.5 Hz, the apparatus was found to be susceptible to intermittent quenching of the spray whereas, at higher frequencies, particularly above 10 Hz, contamination of the nozzle, by what is believed to be the "pull back" effect referred to earlier, was found to occur to an extent which is likely to be unacceptable for most practical coating applications.

Although the invention is described above in the context of electrostatically charging the liquid by techniques as disclosed in British Patent No. 1569707 and European Patent No. 243031, it is to be understood that the invention is also applicable to other techniques of conventional electrostatic spraying such as those involving conduction or corona charging.

It will be appreciated that the invention has various applications in addition to the spraying of plastic targets composed of insulating materials, eg. the spraying of cosmetic products such as hair sprays. In such an application, if the user happens to possess hair with well insulating properties (typically referred to as "dry" hair) and attempts to spray her hair with a conventional uni-polar electrostatic spraying device, the initial spray will charge the hair and thus cause it to tend to repel subsequent spray clouds with the result that continued spraying will fail to reach the intended target; instead the spray will tend to seek other sites such as the face. This problem is overcome in accordance with the invention since the polarity of the charged spray is constantly being switched.

In the embodiment shown in FIG. 1, the high voltage circuitry comprises two high voltage generators producing opposite polarity outputs. FIG. 2 illustrates diagrammatically a high voltage circuit which may be used to supply a bi-polar high voltage for application to a spraying nozzle of the form described with reference to FIG. 1. In this embodiment, the production of a bipolar high voltage output is effected by means of modified Cockcroft-Walton voltage multiplier circuit. A conventional Cockcroft-Walton multiplier comprises two parallel sets of serially connected capacitors with diodes interconnecting the two sets whereby the peak value $V_i$ of an input voltage to the multiplier is transformed to a unipolar output $nV_i$ where n corresponds to the number of diode/capacitor stages in the multiplier.

As shown in FIG. 2, the high voltage generator comprises two parallel sets, 100 and 102, of serially connected capacitors C1–C12 connected to an input voltage source 104. The voltage source 104 produces a high frequency pulse train, typically 20 kHz with a square waveform and a 50% duty cycle, derived from, for example, a low voltage battery supply using a suitable pulse generator such as a multivibrator. The voltage level of the pulse train ranges between a high level, $V_i$, and a low level, such as zero, (assuming positive logic). The level $V_i$ will typically be a multiple of the battery supply voltage produced, for example, by an intermediate voltage multiplying circuit.

Instead of diode interconnections as in a conventional Cockroft-Walton multiplier, the sets of capacitors are interconnected by triggerable bi-directional switches T1–T12. The bi-directional switches T1–T12 are arranged in pairs coupling each junction between the capacitors of one set 100 to opposite sides of a capacitor in the other set 102. The switches are controlled cyclically so that the switches forming each pair are in anti-phase relation, ie. during part of the cycle, switches T1, T3...Tn (where n is odd) are closed while switches T2, T4...Tm (where m is even) are open, and vice versa during the remainder of the cycle.

Although the invention is not limited to any particular form of bi-directional switch, as shown in FIG. 2, the switches T1–T12 preferably are in the form of triacs which are opto-electronically controllable. The switches may, for example, comprise MOC 3020 optically isolated triacs manufactured by Motorola which feature a gallium arsenide infrared emitting diode (LED) and a light activated bi-lateral switch. In the circuit of FIG. 2, the LED associated with each triac device is controlled by a logic circuit 106 in such a way that the LED's associated with switches Tn are energized in anti-phase relation with those associated with switches Tm and also in such a way that LED energization is in a particular phase relation with the input voltage pulse train produced by source 104.

The logic circuit receives inputs from a control signal source 108 and the input voltage source 104. The control signal produced by the source 108 comprises a control pulse train having a pulse repetition rate corresponding to the frequency at which the high voltage generator is required to operate. For example, the control pulse train may be derived by means of suitable frequency divider circuitry (not shown) from the voltage input pulse train produced by the source 104. The logic circuit 106 comprises an exclusive OR gate 110 the output of which is supplied, on the one hand, direct to one set 112 of LED's (for example those associated with the switches Tn) and, on the other hand, via INVERTER 114 to the other set 116 of LED's. In FIG. 2, only one LED of each set is illustrated.

When the control signal produced by source 108 is high, the inverted output of the gate 110 (ie. the output of INVERTER 114) is in phase with the high frequency input voltage produced by the source 104 while the non-inverted output of gate 110 is in anti-phase relation with the input voltage. Consequently, the LED set 116 is energized when the input voltage is high and set 112 is energized when the input voltage is low. Thus, while the control signal is high, the output voltage $V_o$ will be a multiple of the input voltage $V_i$ and will have a predetermined polarity, ie. positive.

When the control signal produced by source 108 is low, the inverted output and non-inverted outputs derived from the gate 110 are respectively in anti-phase relation and in-phase relation with the input voltage. Consequently, the LED set 116 is energized when the input voltage is low and set 112 is energized when the input voltage is high. Thus, when the control signal is low, the output voltage $V_o$ will be a multiple of the input voltage $V_i$ and w have the opposite polarity, ie. negative.

Figure 2:
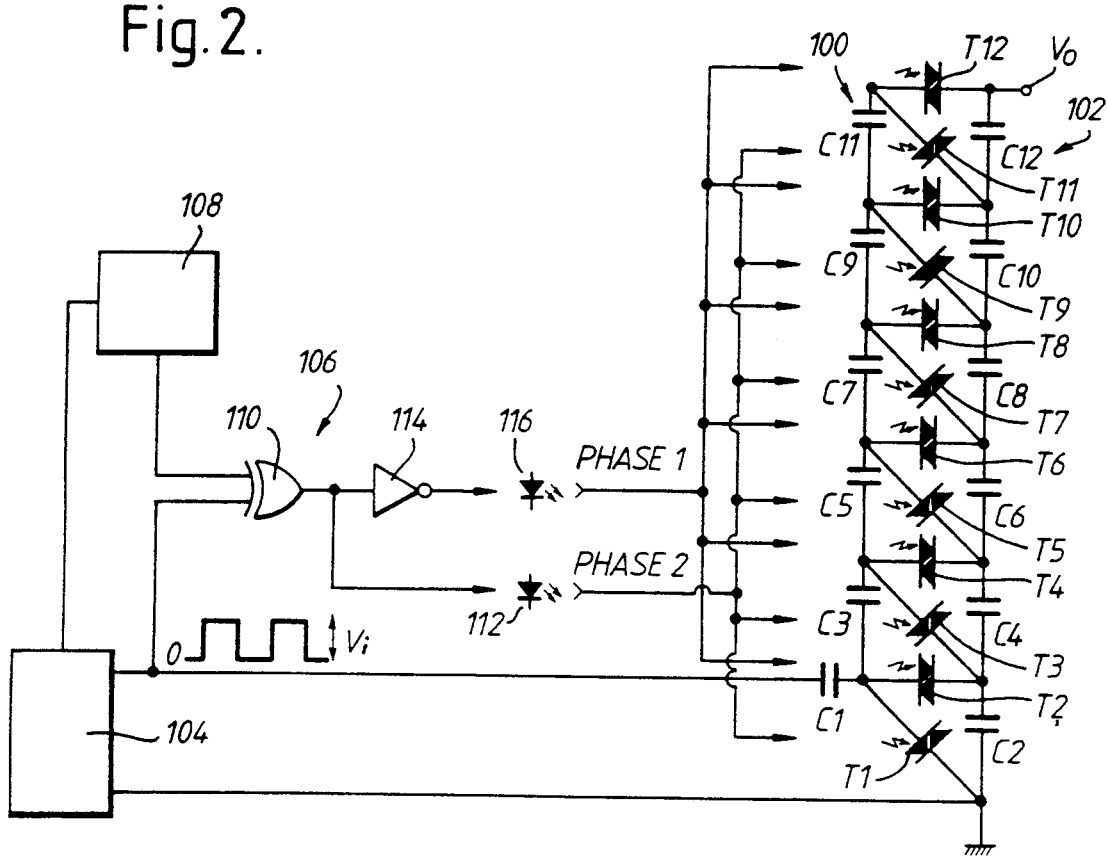

In FIG. 2, only a limited number of multiplier stages are illustrated; it will be appreciated that, in practice, there will be a larger number required in order to produce the high voltages needed for electrodynamic spraying For instance, if the source 104 produces an output voltage of 800V (derived by multiplication of the battery supply voltage by an intermediate voltage multiplier) then the voltage multiplier of FIG. 2 may comprise 18 stages in order to obtain an output $V_o$ about 14kV. It will be appreciated that the voltage multiplying circuit shown in FIG. 2 may be fabricated as a single electronic chip integrated circuit.

Figure 3:
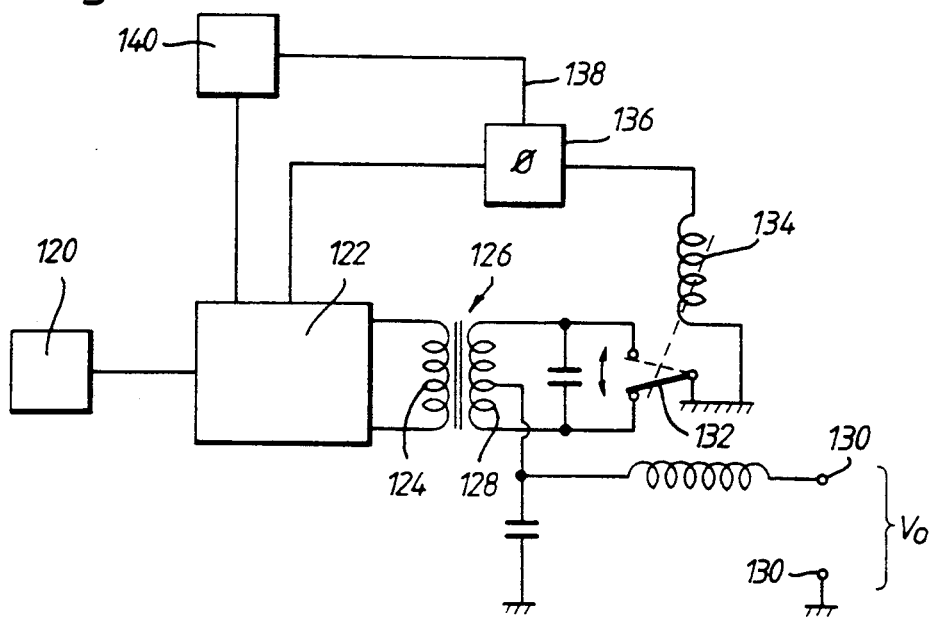

Referring now to FIG. 3, there is shown an alternative bi-polar high voltage generator for use in conjunction with a nozzle as described with reference to FIG. 1. This embodiment comprises an input dc voltage source 120 of several hundred volts derived from, for example, a battery supply voltage by means of an intermediate voltage multiplying circuit (not shown) comprising, for example, a relaxation oscillator, transformer and rectifying circuit. The dc voltage provided by the source 120 is converted to a high frequency alternating current, eg. 20 kHz, in a circuit 122 including an oscillator and the primary 124 of a transformer 126 thereby repeatedly reversing current flow through the primary. The secondary 128 of the transformer is center tapped to provide an output at terminals 130, the magnitude of the output being determined by the turns ratio of the transformer.

A mechanical switch 132, such as a gas filled vibrating switch, is connected to alternately connect the opposite ends of the transformer secondary to ground at a frequency corresponding to the oscillation produced in the primary. Alternating operation of the switch 132 is controlled by a coil 134 energized by a control signal which is derived from the circuit 122 and has a frequency corresponding to the frequency at which current reversal in the primary takes place. The switch 132 is thereby caused to operate synchronously with the current reversal taking place in the primary and serves to convert the ac output of the transformer secondary to dc at the terminals 130.

The polarity of the output is determined by the relative phase between the control signal applied to the coil 134 and the current supplied to the transformer primary. By changing the phase relation from in-phase to anti-phase (or vice versa), the polarity of the output seen at terminals 130 can be reversed. Such reversal is controlled by phase control circuit 136 which is operable to shift the phase of the control signal applied to the coil 134 in dependence on a clock signal applied to an input line 138 to the phase control circuit 136. The clock signal is derived from a pulse generator 140 which is coupled to the oscillator of circuit 122 and has a pulse repetition rate corresponding to the frequency at which the voltage generator is required to operate.

Thus, for example, when the clock signal is high, the phase control circuit 136 may be switched into a condition in which the control signal applied to the coil 134 is in phase with the current flow through the primary. When the clock signal is low, the phase control circuit may be switched into a condition in which the control signal is shifted 180° so as to be in anti-phase relation with the current flow through the primary. In this way, a bipolar high voltage output is obtained at the terminals 130 which reverses polarity at a rate determined by the clock signal.

It will be understood that the frequency of the output from the voltage generating circuit of FIG. 2 or 3 will be selected so that the nozzle produces spray clouds which do not discharge one another to any substantial extent while in flight from the nozzle to the target.

We claim:

1. A method of coating a target which is either so arranged, or is of a nature, that it accumulates charge, said method comprising the steps:
   supplying liquid to a nozzle, liquid feed to the nozzle being passive and;
   applying an alternating high potential produced by and output from high voltage circuitry so that liquid sprayed in atomized form from said nozzle is electrostatically charged,
   a frequency of said alternating high potential being such that each cloud of atomized particles charged with one polarity issues from said nozzle and deposits on said target substantially without discharging any particles from preceding cloud of atomized particles carrying an opposite charge while successive clouds are air-borne, whereby deposited spray clouds substantially neutralize each other at said target.

2. A method of coating a target which is either so arranged, or is of a nature, that it accumulates charge, said method comprising the steps:
   supplying liquid to a nozzle; and, liquid feed to the nozzle being induced by one of capillary and gravity action,
   applying an alternating high potential produced by and output from high voltage circuitry so that liquid sprayed in atomized form from said nozzle is electrostatically charged,
   a frequency of said alternating high potential being such that each cloud of atomized particles charged with one polarity issues from said nozzle and deposits on said target substantially without discharging any particles from a preceding cloud of atomized particles carrying an opposite charge while successive clouds are air-borne, whereby deposited spray clouds substantially neutralize each other at said target.

3. A method of applying a liquid cosmetic product by means of a hand-held electrostatic spraying device having a nozzle and means for supplying liquid cosmetic product to said nozzle for production of an atomized spray wherein applying said liquid cosmetic product involves the deposition of said liquid cosmetic product as an electrostatically charged spray, said application method comprises electrostatically charging said liquid by means of high voltage circuitry providing an output which alternates between opposite polarities so that said spray is alternately charged positively and negatively, a frequency of said alternating output being such that each cloud of atomized particles charged with one polarity issues from said nozzle substantially without discharging particles of a preceding cloud of atomized particles carrying an opposite charge at least while the clouds are airborne.

4. A method of applying a liquid cosmetic product by means of a hand-held electrostatic spraying device having a nozzle and means for supplying liquid cosmetic product to said nozzle for production of an atomized spray wherein applying said liquid cosmetic product involves the deposition of said liquid cosmetic product on a user of said device as an electrostatically charged spray, said method comprises electrostatically charging said liquid cosmetic product by means of high voltage circuitry providing an output which alternates between opposite polarities at a frequency so that said spray is alternately charged positively and negatively in such a way that each cloud of atomized particles charged with one polarity issues from said nozzle substantially without discharging particles of a preceding cloud of atomized particles carrying the opposite charge, whereby said clouds of particles neutralize one another upon deposition on said user and prevent a build-up of charge on said user when said user is isolated from ground.

5. A method as claimed in any one of claims 1, 2, 3 or 4 in which said frequency of said alternating output is no greater than 10 Hz.

6. A method as claimed in any one of claims 1, 2, 3 or 4 in which said frequency is no greater than 5 Hz.

7. A method as claimed in any one of claims 1, 2, 3 or 4 in which said frequency is at least 0.5 Hz.

8. A method as claimed in any one of claims 1, 2, 3 or 4 in which said frequency is at least 1 Hz.

9. A method as claimed in any one of claims 1, 2, 3 or 4 in which said alternating output is provided by two high tension generators producing outputs of opposite polarity and switching means arranged to render said generators effective to alternately charge said liquid.

10. A method as claimed in any one of claims 1, 2, 3 or 4 in which said alternating output is provided by a single high tension generator producing a bi-polar output.

11. A method as claimed in any one of claims 1, 2, 3 or 4 in which said alternating output is of generally sinusoidal or generally square waveform.

12. A method as claimed in any one of claims 1, 2, 3 or 4 in which said alternating output produced by said high voltage circuitry is of generally sinusoidal or generally square waveform.

13. A method as claimed in any one of claims 1, 2, 3 or 4 in which said alternating output is applied to said nozzle.

14. A method as claimed in any one of claims 1, 2, 3 or 4 in which said alternating output is applied to said nozzle via said liquid supply.

15. A method as claimed in claim 3 or 4 in which said output alternates between said opposite polarities at a frequency between 0.5 and 10 Hz.

16. An electrostatic spraying device comprising:
a nozzle having a nozzle outlet;
means for supplying liquid to said nozzle; and high voltage circuitry arranged so that, in use, liquid emerging at said nozzle outlet is subject to an electrical field sufficiently high to draw said liquid from said nozzle in the form of at least one ligament which breaks up into charged droplets to form a spray,
said high voltage circuitry comprising a bi-polar voltage generator producing an output voltage which alternates with a frequency such that each cloud of liquid droplets charged with one polarity issues from said nozzle substantially without discharging droplets of a preceding cloud carrying an opposite charge at least while successive clouds are in flight from said nozzle to a target, in which said high voltage circuitry comprises a voltage multiplying circuit having:
input terminal means for connection to a pulsed voltage source;
output terminal means for providing an output voltage which is bipolar and is a multiple of a voltage applied to said input terminal means;
two parallel sets of serially connected capacitors connected between said input and output terminal means;
a plurality of paired bi-directional switches interconnecting said sets of capacitors in such a way that each junction between successive capacitors in one of said sets is connected to a pair of said switches which couple said junction to opposite sides of a capacitor of another set; and
means for effecting alternating operation of said switches of each pair in phased relation with said pulsed voltage source and for cyclically varying such phased relation to cause said output voltage at said output terminal means to alternate between opposite polarities with a frequency no greater than 10 Hz.

17. A device as claimed in claim 16 in which said high voltage is applied to said nozzle.

18. A device as claimed in claim 17 in which said high voltage is applied to the nozzle via the liquid supply.

19. The apparatus as claimed in any one of claims 16-18 in which said frequency of said alternating high voltage circuitry is no greater than 10 Hz.

20. The apparatus as claimed in any one of claims 16-18 in which said frequency is no greater than 5 Hz.

21. The apparatus as claimed in any one of claims 16-18 in which said frequency is at least 0.5 Hz.

22. The apparatus as claimed in any one of claims 16-18 in which said frequency is at least 1 Hz.

* * * * *